United States Patent [19]

Dantlgraber

[11] Patent Number: 4,665,697

[45] Date of Patent: May 19, 1987

[54] HYDRAULIC SYSTEM FOR CHARGING AN ACCUMULATOR

[75] Inventor: Jörg Dantlgraber, Lohr-Sackenbach, Fed. Rep. of Germany

[73] Assignee: Mannesmann Rexroth GmbH, Fed. Rep. of Germany

[21] Appl. No.: 634,579

[22] Filed: Jul. 25, 1984

[30] Foreign Application Priority Data

Aug. 3, 1983 [DE] Fed. Rep. of Germany ....... 3327978
Jul. 17, 1984 [DE] Fed. Rep. of Germany ....... 3426354

[51] Int. Cl.$^{4}$ .............................................. F16D 31/02
[52] U.S. Cl. .......................................... 60/418; 60/452
[58] Field of Search ......................... 60/413, 418, 452; 417/218, 222

[56] References Cited

U.S. PATENT DOCUMENTS

| | | | |
|---|---|---|---|
| 2,799,995 | 7/1957 | Herman . | |
| 4,157,233 | 6/1979 | Horiuchi | 417/218 |
| 4,518,321 | 5/1985 | Schniederjan | 60/452 |

FOREIGN PATENT DOCUMENTS

| | | | |
|---|---|---|---|
| 2521367 | 11/1976 | Fed. Rep. of Germany . | |
| 2650751 | 5/1977 | Fed. Rep. of Germany . | |
| 2650752 | 5/1977 | Fed. Rep. of Germany . | |
| 3042113 | 5/1981 | Fed. Rep. of Germany . | |
| 7802011 | 8/1978 | France . | |
| 0072073 | 6/1977 | Japan | 60/452 |
| 0094103 | 6/1982 | Japan | 60/418 |
| 0157802 | 9/1982 | Japan | 60/452 |

*Primary Examiner*—Carroll B. Dority, Jr.
*Attorney, Agent, or Firm*—Harness, Dickey & Pierce

[57] ABSTRACT

A hydraulic system comprises an accummulator for supplying hydraulic fluid to a load, a variable displacement pump for charging the accummulator and a valve means for adjusting the pump to deliver a high pressure for charging the accummulator and then to a low pressure when the load is supplied with fluid from the accummulator. By this operation, in which the pump is switched between the zero stroke positions of high and low pressure, the losses of the pump are decreased and the lifetime is increased.

8 Claims, 3 Drawing Figures

HYDRAULIC SYSTEM FOR CHARGING AN ACCUMULATOR

BACKGROUND OF THE INVENTION

In a known hydraulic system, a hydraulic accummulator is charged by a constant displacement pump to supply fluid to a load. The fluid flow of the pump is supplied to the accummulator. When the maximum accummulator pressure is reached, the fluid flow of the pump is returned via a bypass valve to the reservoir. While the pump operates through the bypass, the load is supplied with pressurized fluid from the accummulator. Accordingly the accummulator is discharged. When the accummulator pressure reaches a mimimum pressure allowed, the fluid flow of the pump is again fed to the accummulator. The valve can be either a special accummulator charge valve or a regular directional control valve which is controlled by pressure responsive switches. To avoid a permanent actuation of the valve, the pressure difference between the maximum and minimum pressure should be relatively large which results in a large variation of the accummulator pressure. Furthermore, the switching noise is remarkable.

According to a further known system the disadvantages above referred to can be avoided when the accummulator is connected to a variable displacement pump. Pumps of this type comprise a pressure control valve which controls the displacement volume of the pump such that the accummulator pressure is maintained constant. However, there is a disadvantage in that the pump must permanently operate against a high pressure which results in high hydraulic losses and excessive strain.

SUMMARY OF THE INVENTION

It is an object of the present invention to avoid the disadvantages above referred to and to provide for a system, the power losses of which are substantially decreased and the life time of the variable displacement pump is highly increased.

According to the invention there is provided a hydraulic system for charging an accummulator from which pressurized fluid is supplied to a load, comprising a pump with an adjustable volume of displacement, said pump having a pressure control valve and a volume adjusting means which is connected through said pressure control valve to the pump pressure line leading to said accummulator, and which adjusting means is further controlled in response to the pump pressure and to a control pressure acting on the valve plunger of said pressure control valve in opposition to the pump pressure for adjusting the volume of displacement of said pump, the improvement comprising a valve means which is connected to said pump pressure line, said valve means switching said control pressure acting on the pressure control valve between a first and a second pressure value in response to the pump pressure, said first value of the control pressure corresponding to a maximum accummulator pressure causing the pump to be adjusted to a low pressure mode in the zero stroke position of the pump and said second value of the control pressure corresponding to a minimum accummulator pressure causing the pump to be adjusted to a high pressure mode in the zero stroke position of the pump.

Thus the variable displacement pump is adjusted to a low zero stroke pressure operation when the accummulator pressure becomes a maximum to substantially decrease strain and loss of the pump as long as the accummulator supplies pressurized fluid to the load. When the accummulator pressure reaches the minimum pressure value in the discharge cycle, the variable displacement pump is adjusted to the high zero stroke pressure mode preselected. Switching the pump between the two modes takes place by the control pressure which is supplied to the control pressure valve of the pump which control pressure takes a first and a second value. Changing the control pressure between both the pressure values is obtained by a valve means providing for maintaining the pump at the low zero stroke pressure until the accummulator is discharged to the minimum pressure and must be charged again.

Further valuable features may be derived from the subclaims.

DETAILED DESCRIPTION

Figure 1:
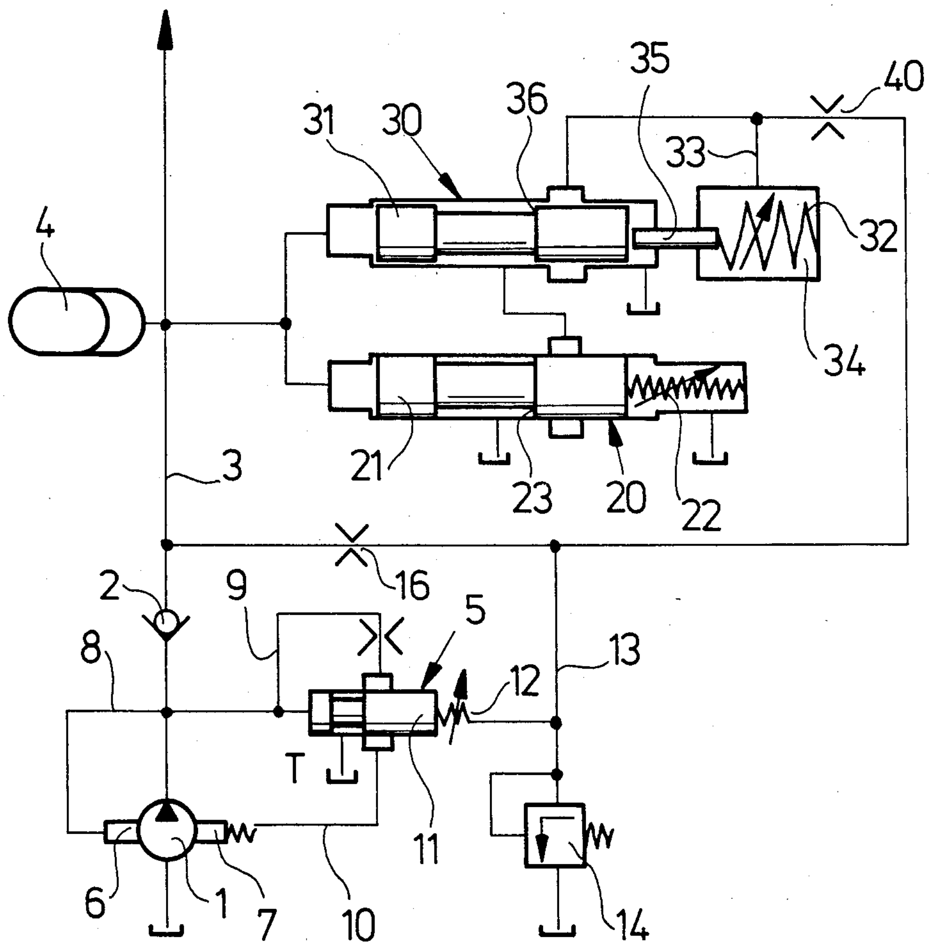
FIG. 1 shows diagrammatically a hydraulic accummulator charging system including a variable displacement pump.

As seen in FIG. 1, a variable displacement pump 1 supplies a fluid flow via a check valve 2 to a line 3 which is connected to a load not shown and to which a hydraulic accummulator 4 is connected.

The variable displacement pump includes in a manner known per se a control pressure valve 5 which operation is shortly explained as follows.

The eccentric position of the stator ring of the variable displacement pump and thus the maximum displacement volume is determined by a pair of adjusting pistons 6 and 7 each having a different diameter which pistons each are engaged with the pump pressure through a line 8 and 9, or, respectively line 10. The larger piston 7 is additionally engaged by a spring urging the stator ring to the eccentric position when the pump is not in operation and when the pump is started to ensure a maximum displacement volume at minimum pressure. The piston 11 of the pressure control valve 5 is engaged by the pump pressure via the line 9 and in opposition thereto by an adjustable spring 12 and a control pressure in a control pressure line 13. The maximum control pressure is adjusted at a pressure relief valve 14. When the pressure acting on the pressure control valve 5 reaches the value which is predetermined by means of the spring 12 and the control pressure, the plunger 11 is displaced to open the line 10 towards the reservoir T.

Figure 2:
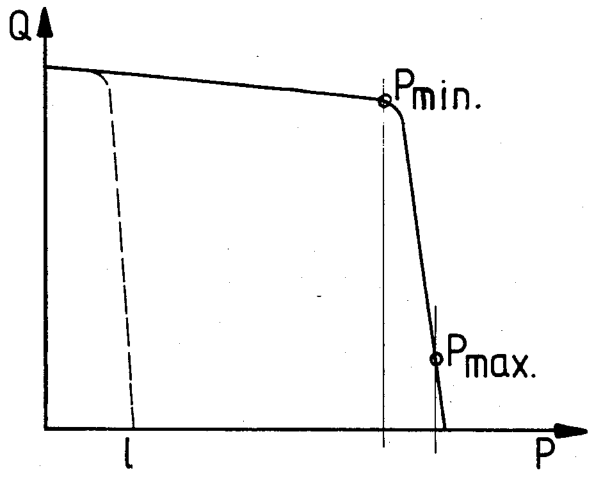
FIG. 2 shows diagrammatically the relation between displacement volume and pump pressure of the variable displacement pump and FIG. 3 shows diagrammatically a second embodiment of a hydraulic accummulator charging system.

Then the piston 6 adjusts the variable displacement pump towards a smaller displacement volume and a higher pressure. The characteristic of the pump is shown in FIG. 2. The relation between the pump pressure P and the displacement volume Q is shown.

The control pressure line 13 is connected via a throttle 16 to the pressure line 3. Two valves 20 and 30 connected in series in the control pressure line 13 control the connection of the control pressure line 13 to the reservoir T. The piston 21 of the first valve 20 is engaged by the pump pressure or, respectively the accummulator pressure prevailing in line 3 and in opposition thereto by an adjustable spring 22 for selecting the minimum pressure $P_{min}$ at which the accumulator 4 needs a charge. The piston 31 of the second valve 30 is alike engaged by the accummulator pressure and in opposition thereto by an adjustable spring 32 and by the control pressure via the branch line 33. It is seen that the control pressure in the spring chamber 34 acts through an auxiliary piston 35 on the piston 31 having a larger diameter. When pistons 21 and 31 are displaced to the right, the line 13 is connected to the reservoir by means of the piston control edges 23 and 36 to decrease the control pressure to zero value.

The operation is as follows. For charging the accummulator the pump is started. When the pump and accummulator pressure increase to the value $P_{min}$, the piston 21 of the valve 20 is displaced and the control edge 23 opens. At this very pressure the pressure control valve 5 begins to adjust the pump 1 towards smaller displacement volume so that the pressure increases according to the characteristic shown in FIG. 2.

When the pressure value $P_{max}$ is reached (shortly before the zero stroke position of the pump at which no displacement volume is supplied anymore), the control edge 36 of the second valve 30 opens. With a predetermined control pressure the pressure value $P_{max}$ is adjusted by means of the spring 32.

Since both control edges 36 and 23 are now open, the control pressure in the line 13 decreases to zero. Thus the pressure control valve 5 is pressure released and the piston 11 is displaced by the pump pressure to open the connection of the line 10 to the reservoir so that the pump 1 is reset to a zero stroke position characterized by a very low pressure. This low pressure characteristic in the zero stroke position of the pump is shown in FIG. 2 in broken lines.

Now the accummulator 4 supplies fluid to the load so that the pressure in turn decreases to the value $P_{min}$. Since the control pressure is zero and since the auxiliary piston 35 thus applies no hydraulic force to the piston 31 which is engaged merely by the spring, the valve 30 is maintained in the opened position. When the pressure $P_{min}$ is reached, the valve 20 closes. Accordingly the control pressure in the line 13 increases. When the high value of the control pressure is reached which is adjusted at the valve 14, the valve 30 closes. Now the pressure control valve 5 is adjusted again to the high control pressure and the pump accordingly charges the accummulator 4.

It is seen that the valve 20 opens and closes at the pressure value $P_{min}$ whereas the valve 30 opens at the pressure $P_{max}$, but is maintained in the open position when the accummulator pressure decreases until reaching the value $P_{min}$ at which the valve 20 closes followed by closing the valve 30. Thus the variable displacement pump 1 is switched between a high zero stroke pressure for charging the accummulator and a low zero stroke pressure during discharging the accummulator.

A throttle 40 is provided in the control pressure line 13 to delay the pressure change in the spring chamber 12 of the valve 5 to provide for a soft switching of the pump.

Figure 3:
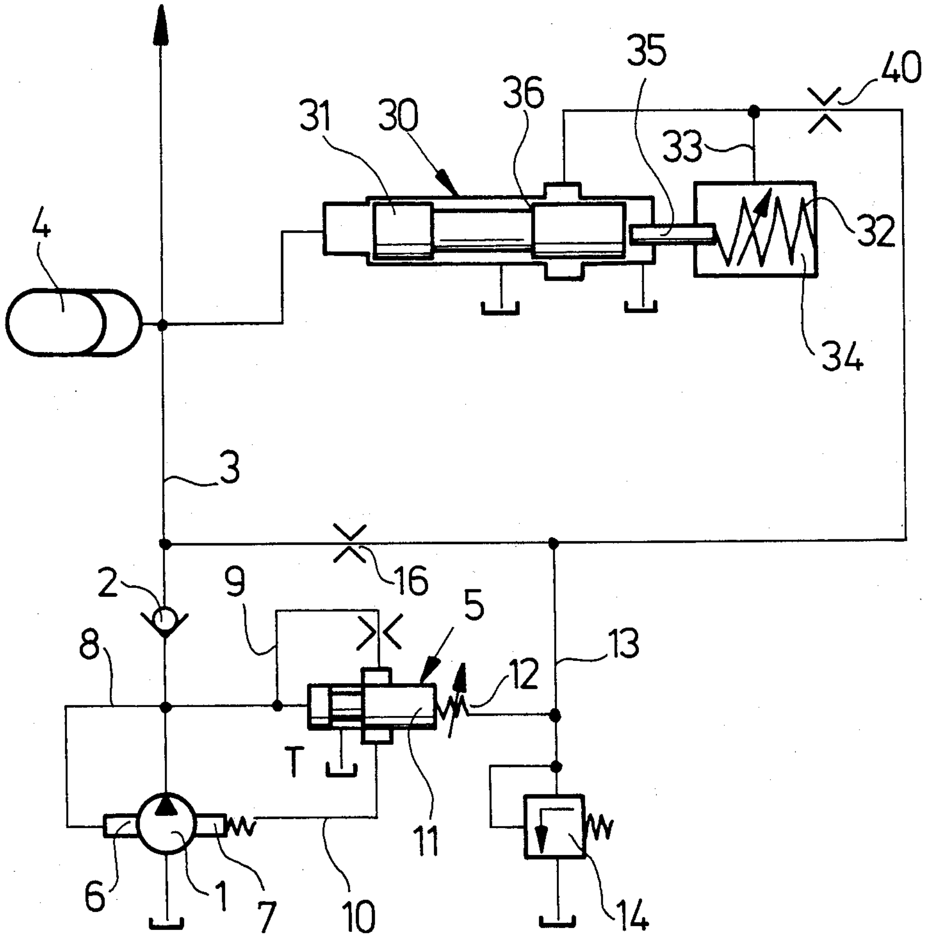

According to the embodiment shown in FIG. 3, the valve 20 is eliminated, but otherwise the embodiment is identical with the embodiment shown in FIG. 1 using the same reference numerals throughout. The valve 30 provides for a switching hysteresis, which means that a higher pressure is needed to open the valve for connecting the control pressure line 13 to the reservoir than the pressure needed for closing the valve.

The operation is as follows. For charging the accummulator the pump is started. With increasing pressure in the accummulator 4 the control pressure value 5 adjusts pump 1 towards smaller displacement volume as already explained above.

When the pressure $P_{max}$ is reached, shortly before the zero stroke position of the pump at which the pump delivers no volume anymore, the piston 31 of the valve 30 is displaced and the control edge 36 opens. Now the control pressure in the line 13 decreases to zero, the pressure control valve 5 is pressure released and the piston 11 opens the connection of line 10 to the reservoir in being displaced by the pump pressure so that the adjusting pump is immediately reset to zero stroke position at very small pressure.

Now the load is fed with fluid from the accummulator 4 and the pressure decreases to the lower value $P_{min}$. Due to the inherent switching hysteresis of the valve 30, the piston 31 will return to the position shown in which the connection between the control pressure line 13 to the reservoir is closed, only then, when the accummulator pressure has reached a smaller value.

Then the connection to the reservoir is closed by the control edge 36 of the valve 30 and since the control pressure line is filled again via the throttle 16 from the pressure line 3, the control pressure in the line 13 increases to the high control pressure value which causes the pressure control valve 5 to close the connection of line 10 to the reservoir, while supplying pressure to the piston 7 of the pump via the line 9, the valve 5 and the line 10 so that the pump now charges the accummulator 4 again.

In response to switching the control pressure by means of the valve 30 which is actuated by two different pressure values of the accumulator, the variable displacement pump 1 is switched between the high zero stroke pressure for charging the accummulator and the low zero stroke pressure during discharging of the accummulator.

What is claimed is:

1. A hydraulic system for charging an accumulator from which pressurized fluid is supplied to a load, comprising a pump having an output and providing an adjustable volume of displacement, volume adjusting means for adjusting the volume of output of said pump, a pressure control valve, said volume adjusting means being connected through said pressure control valve to a pump pressure line leading to said accumulator, and said adjusting means being controlled in response to the pump pressure and to a control pressure acting on said pressure control valve in opposition to the pump pressure for adjusting the volume of displacement of said pump, the improvement comprising valve means connected to said pump pressure line for adjusting the control pressure acting on said pressure control valve between a first and a second pressure in response to the pump output pressure, said first value of the control pressure corresponding to a maximum accumulator pressure for causing the pump to be adjusted to a low pressure mode in the zero stroke position of the pump and said second value of the control pressure corresponding to a minimum accumulator pressure causing the pump to be adjusted to a high pressure mode in the zero stroke position of the pump, said valve means including an auxiliary piston responsive to control pressure for urging said valve means toward a closed position.

2. The hydraulic system according to claim 1 wherein the valve means comprises a valve for controlling the connection of the pressure line to a reservoir, said valve opening when the maximum accumulator pressure is reached to vent the control pressure to said reservoir and said valve closing when the minimum accumulator pressure is reached to build up the control pressure in said pressure line.

3. A hydraulic system according to claim 2, wherein a piston of the valve is responsive to accumulator pressure or pump pressure and the auxiliary piston and a spring acts in opposition thereto for selecting the maximum accumulator pressure.

4. A hydraulic system according to claim 1, wherein a throttle is provided in the pressure control line between the pressure control valve and the valve.

5. A hydraulic system according to claim 1, wherein the control pressure line is connected to the pump pressure line through a throttle.

6. A hydraulic system according to claim 1, wherein the valve means comprises a pair of series connected valves for controlling the connection of the control pressure line to a reservoir, the first valve opening when the minimum accumulator pressure is reached in charging the accumulator to build up the control pressure in the control pressure line.

7. A hydraulic system according to claim 6, wherein the first valve includes a piston responsive to the accumulator pressure and a spring acts in opposition thereto for selecting the minimum accumulator pressure.

8. A hydraulic system according to claim 6 wherein the first valve includes a piston responsive to accumulator pressure or pump pressure, and the auxiliary piston and a spring act in opposition to accumulator pressure for selecting the maximum accumulator pressure.

* * * * *